(No Model.)
W. C. HUMPHREY.
DRESS AND MUD GUARD.
No. 594,694. Patented Nov. 30, 1897.
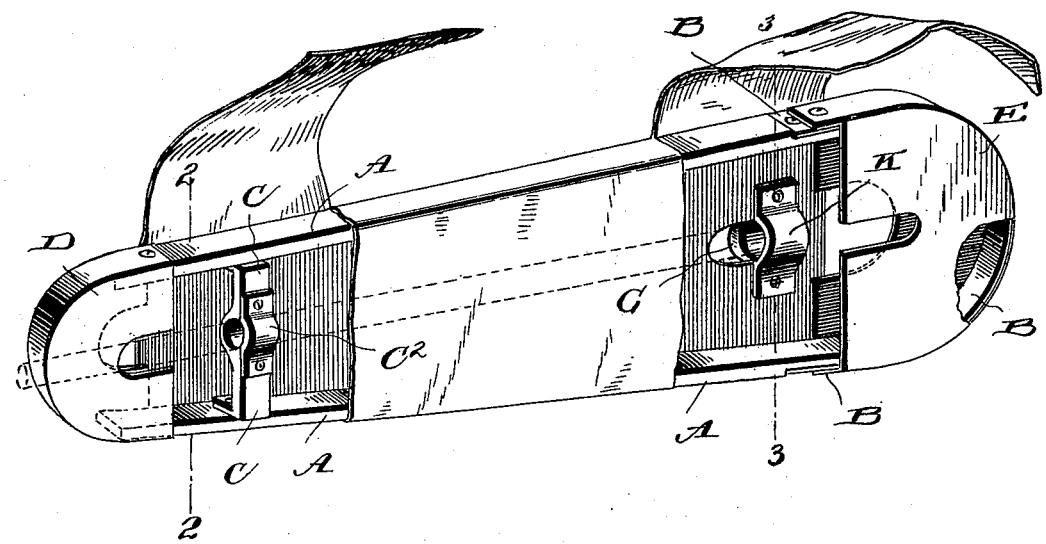
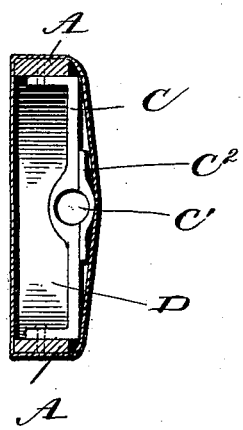
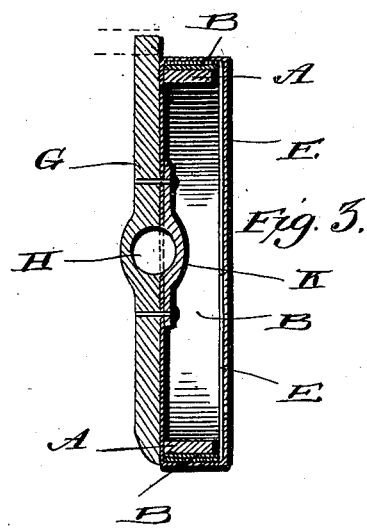
Witnesses: Inventor:
Wm. C. Humphrey,
by Franklin H. Hough
Atty.

UNITED STATES PATENT OFFICE.

WILLIAM C. HUMPHREY, OF JAMESTOWN, NORTH DAKOTA.

DRESS AND MUD GUARD.

SPECIFICATION forming part of Letters Patent No. 594,694, dated November 30, 1897.

Application filed August 11, 1896. Serial No. 602,425. (No model.)

*To all whom it may concern:*

Be it known that I, WILLIAM C. HUMPHREY, a citizen of the United States, residing at or near Jamestown, in the county of Stutsman and State of North Dakota, have invented certain new and useful Improvements in Sprocket Wheel and Chain Guards; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful attachments for bicycles, and especially to a covering or sprocket and chain guard which may be easily and quickly applied to any ordinary construction of bicycles and portions detached when it is desired to lubricate, examine, or clean the various parts which are thus protected.

In carrying out my invention I provide a framework which is designed to be rigidly held to the frame of the bicycle by suitable brackets and clamps with the necessary screws or bolts, and the provision of metallic (or leather) inclosing members at each end which are secured to the framework of the guard and about a portion of each sprocket-wheel. About the frame is secured a covering of any suitable material, so as to exclude dust, rain, and mud from the sprocket wheels and chain, which will prevent a great deal of wear and friction on the said parts of the propelling mechanism of the bicycle, also saving the lubricating material and not necessitating as frequent cleaning of the parts within as would be the case were no guard employed.

While in the present instance I have shown my guard adapted to be applied to the common construction of frame of bicycles, by slight variations in the construction of the adjusting means the guard may be applied to a lady's "wheel," thus serving, besides the function of a guard to exclude dirt, &c., as a dress-guard.

To these ends and to such others as the invention may pertain the same consists, further, in the novel construction, combination, and adaptation of the parts, as will be hereinafter more fully described, and then specifically defined in the appended claims.

I clearly illustrate my invention in the accompanying drawings, which, with the letters of reference marked thereon, form a part of this specification, and in which drawings similar letters of reference indicate like parts throughout the several views, in which—

Figure 1 is a perspective view of my improved guard with one side covering removed to better illustrate the interior construction. Fig. 2 is a transverse section through the guard on line 2 2 of Fig. 1. Fig. 3 is a cross-sectional view on line 3 3 of Fig. 1.

Reference now being had to the details of the drawings by letter, A designate the upper and lower strips of the frame of the guard, and these strips are made of any suitable material, as of wood, and have secured at their ends the curved steel strips B B, which are secured by screws or any other means to the ends of the said strips, and the said steel strips are about the same width as the strips A or slightly narrower. Mounted over the ends of the frame and covering the steel strips forming the curved ends are the circular inclosures D and E, each being slotted and cut away to allow the casings to fit over the sprocket-wheels and hubs thereof.

Secured between the strips A, near the narrow end of the guard, is secured the bracket C, having formed near its middle portion an eye C', having an adjustable piece $C^2$, which is used with the necessary screws when it is desired to attach the guard to the frame of the bicycle. Near the other end of the guard, opposite the edges of the casing E, is secured the strip G, the upper end of which may extend above the upper strip A, if desired, so as to allow the said strip G to be clamped or otherwise secured to the frame of the bicycle. At the middle portion of the strip G is a groove H, which forms, with the detachable clamp or bracket K, a bearing by which the large end of the guard may be secured to the frame of the bicycle. The two brackets, one near the narrow and the other near the wide end of the guard, are not in the same plane, but in parallel planes, the bracket near the narrow end of the guard being adapted to turn slightly on its pivotal screws, so as to bring the eyes in each bracket in alinement to adapt the guard to be readily applied to the frame of the bicycle.

The sides of the guard may be covered with leather or any suitable material, and thin steel or wood strips may be employed, if desired, which are provided with apertures through which screws may be passed, the said strips being attached over or near the edges of the leather or other covering or in a hem of said covering.

I would say that the guard may be made or used without the curved steel band to connect the strips A A at the small sprocket-wheel, and the rear wheel of bicycle can thus be more conveniently removed, if necessary, for repair of wheel or tire.

Bent wood may be used for main part of frame in place of the wood strips and curved steel connection, if deemed desirable.

Various other changes as to details of construction may vary without departing from the spirit of my invention, which consists, essentially, in the construction hereinbefore described, and illustrated in the accompanying drawings.

I am aware that it is common or not unusual to construct guards for bicycles in which the sprocket-wheels and the chains are mostly or entirely inclosed in a casing the parts of which are detachable, the said guard being supported on the frame of a bicycle, and I do not make a broad claim for such a construction.

Having thus described my invention, what I claim to be new, and desire to secure by Letters Patent, is—

A guard for sprocket wheels and chains for bicycles, comprising in combination, the strips A A, the recessed, metallic cap D fitted over the rear ends of said strips, the band B secured in recessed portions at the forward ends of said strips and connecting the same, the recessed, metallic cap E fitted over the said connecting-band B and secured thereto, a leather covering for the space between the said caps, and the bracket G secured to the strips on the outside of the said covering, the removable plate K secured to the said bracket and the bracket C between angled ends secured to the inner face of the said strips A A, all substantially as shown and described.

In testimony whereof I affix my signature in presence of two witnesses.

WILLIAM C. HUMPHREY.

Witnesses:
ALFRED STEEL,
O. L. CHURCHILL.